Figure 1:
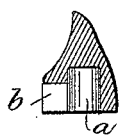

(No Model.)

R. BREWSTER.
ARTIFICIAL TOOTH.

No. 440,131.  Patented Nov. 11, 1890.

Witnesses.
Baltus DeLong.
C. M. Brooke.

Inventor:
Robert Brewster,
By his Atty's.
Baldwin, Davidson & Wight.

UNITED STATES PATENT OFFICE.

ROBERT BREWSTER, OF LONDON, ENGLAND.

ARTIFICIAL TOOTH.

SPECIFICATION forming part of Letters Patent No. 440,131, dated November 11, 1890.

Application filed August 20, 1890. Serial No. 362,473. (No model.)

*To all whom it may concern:*

Be it known that I, ROBERT BREWSTER, manufacturer, a subject of the Queen of Great Britain, residing at Nos. 6 to 10 Lexington Street, Golden Square, London, England, have invented certain new and useful Improvements in Artificial Teeth, of which the following is a specification.

My invention more especially relates to that class of artificial teeth known as "mineral or porcelain" teeth. Mineral teeth, incisors especially, as at present constructed, may, for the purposes of this specification, be divided into two classes. The first of these has metal pins or fastenings directly uniting the tooth and base, the disadvantages and inconvenience attendant upon which mode of construction are well known. The second class have the teeth directly united with a vulcanite or other plastic base. This method of construction has also heretofore been attended with serious disadvantages, as it involves inserting the teeth deeply in the base, which weakens the latter, besides necessitating its being inconveniently thick, as well as its projection too high up on the teeth to grasp them firmly, which projection is unsightly.

The object of my invention is neatly and firmly to secure an artificial tooth to its base without the use of metal connections or fastenings united to the teeth and without impairing or removing any portion of the surface of the tooth.

In order to carry out my invention I form a longitudinal opening in the tooth extending from the base into the crown, taking care, however, not to cut through or remove any portion of the latter. This hole is preferably approximately central, round, and undercut, or slightly flaring from base to crown. Below the surface of the crown I cut away a portion of the lingual side or inner wall of the tooth, so as to form a longitudinal slot therein communicating with the longitudinal opening, and preferably flaring or undercut from the base toward the crown. Teeth thus constructed, when fixed in a vulcanite or other plastic base, have the central opening and slot filled with the material of the base in which they are embedded, the tooth and base being thus connected by a solid column or pillar filling the interior of the tooth, and this column is strengthened by a buttress formed of the material filling the slot. I thus secure a firm connection and strong attachment of the tooth and base without the necessity of the latter projecting upwardly on the outside of the former, and am enabled to produce a very natural appearance. The slot may also serve as a vent during vulcanization.

When using my improved teeth as crowns for natural roots, I prefer to cut the slot higher than when using a vulcanite base, as I thus secure a stronger connection.

The subject-matter claimed is hereinafter specified. Unless otherwise specified, the construction is usual and well known.

The accompanying drawings show various ways of carrying out my invention in the best way now known to me.

Figure 2:
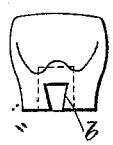
Figure 6:
Figure 7:
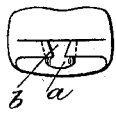
Figure 3:
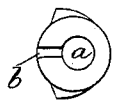
Figure 8:
Figure 4:
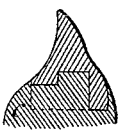
Figure 5:
Figure 9:
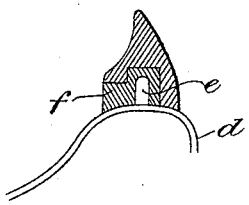

Figure 1 is a vertical section, Fig. 2 a back view, and Fig. 3 a base view, of an incisor-tooth embodying my improvements. Figs. 4 and 5 show, respectively, a section and front view of this tooth set in vulcanite. Figs. 6, 7, and 8 show, respectively, a section, a back view, and a base view, of a molar tooth embodying my improvements. Fig. 9 is a section illustrating my improved tooth fixed to a metal base or plate.

A longitudinal opening or hole *a* is shown as extending through the base into the crown portion of the tooth, being represented as cylindrical in the first five figures, and in Figs. 6, 7, and 8 as undercut from base to crown. A cut or slot *b* extends from the base upward to the crown portion of the tooth through the rear wall, merging into or intersecting the central hole. Figs. 1 and 2 show this slot as not extending as far inward toward the crown of the tooth as the central hole *a*, while Fig. 4 shows both slot and hole as of equal depth. Figs. 2, 6, and 7 also show this slot as undercut or flaring from base to crown. Fig. 8 also shows the side walls of the slot as curved or flaring outwardly. Figs. 4 and 5 show the teeth as set in a base *c* of vulcanite. Fig. 9 shows a metal base or plate *d*, having a pin *e* secured thereto and united with a tooth resting on the base by cement or other stopping, filling the hole and slot.

The teeth are fixed as crowns to natural roots in a similar way, the pin e being fixed to the root in either case and not to the tooth.

What I claim as of my own invention, and desire to secure by Letters Patent, is—

1. An artificial tooth constructed substantially as hereinbefore set forth, with an inwardly-flaring or undercut longitudinal opening extending through the base into the crown, but terminating inside its surface, and a slot in the rear wall of the base, open at the base and extending into the central opening.

2. An artificial tooth constructed substantially as hereinbefore set forth, with a longitudinal opening extending through the base into the crown, but terminating inside its surface, and an inwardly-flaring or undercut slot in the rear wall of the base intersecting said opening.

3. An artificial tooth constructed substantially as hereinbefore set forth, with an inwardly-flaring or undercut longitudinal opening extending through the base into the crown, but terminating inside its surface, and a corresponding parallel inwardly-flaring or undercut intersecting slot.

4. The combination, substantially as hereinbefore set forth, of a tooth, a central longitudinal inwardly-flaring opening extending through its base into but not through the surface of the crown, a corresponding inwardly-flaring slot intersecting the central opening, and a base of plastic material in which the tooth is embedded and by which its opening and slot are filled, to secure the firm connection of the tooth and base.

ROBERT BREWSTER.

Witnesses:
GEO. JOHNSON,
GEO. JACKSON.